(12) United States Patent
Tyrén et al.

(10) Patent No.: US 6,225,905 B1
(45) Date of Patent: *May 1, 2001

(54) SENSOR FOR REMOTE DETECTION OF OBJECTS

(75) Inventors: Carl Tyrén, Monaco (SE); Christian Quinones, Solliès-Pont (FR)

(73) Assignee: RSO Corporation N.V., Curacao (AN)

( * ) Notice: Subject to any disclaimer, the term of this patent is extended or adjusted under 35 U.S.C. 154(b) by 0 days.

This patent is subject to a terminal disclaimer.

(21) Appl. No.: 09/125,134

(22) PCT Filed: Feb. 11, 1997

(86) PCT No.: PCT/SE97/00198

§ 371 Date: Nov. 13, 1998

§ 102(e) Date: Nov. 13, 1998

(87) PCT Pub. No.: WO97/29463

PCT Pub. Date: Aug. 14, 1997

(30) Foreign Application Priority Data

Feb. 12, 1996 (SE) .................................................. 9600528

(51) Int. Cl.⁷ .................................................. G08B 13/14
(52) U.S. Cl. ........................................ 340/572.6; 340/551
(58) Field of Search .............................. 340/572.6, 572.1, 340/551

(56) References Cited

U.S. PATENT DOCUMENTS

| | | | |
|---|---|---|---|
| 4,682,154 | * | 7/1987 | Fearon et al. ................ 340/572.6 |
| 5,003,291 | * | 3/1991 | Strom-Olsen et al. .......... 340/572.6 |
| 5,015,992 | * | 5/1991 | Strom-Olsen et al. .......... 340/551 |
| 5,015,993 | * | 5/1991 | Strom-Olsen et al. .......... 340/551 |
| 5,030,940 | | 7/1991 | Siikarla . |
| 5,204,526 | * | 4/1993 | Yamashita et al. ............ 340/572.6 |
| 5,275,122 | | 1/1994 | Stolz et al. . |
| 5,406,262 | | 4/1995 | Herman et al. . |
| 5,414,412 | | 5/1995 | Lian . |
| 5,469,140 | | 11/1995 | Liu et al. . |

FOREIGN PATENT DOCUMENTS

WO 93/14478  7/1993 (WO) .

OTHER PUBLICATIONS

Panina, L. V. et al. "Giant magneto–impedance and magneto–inductive effects in amorphous alloys (invited)"; J. Appl. Phys.; vol. 76, No. 10; Nov. 15, 1994; pp. 6198–6203.

"Patch Antennas for GPS Applications"; Trans–Tech; Publication No. 50040100; May 1995.

O'Handley, "Magnetic Materials for EAS Sensors", *Journal of Materials Engineering and Performance*, vol. 2, No. 2, Apr. 1993, whole article.

* cited by examiner

Primary Examiner—Jeffery Hofsass
Assistant Examiner—John Tweel, Jr.
(74) Attorney, Agent, or Firm—Merchant & Gould P.C.

(57) ABSTRACT

A sensor for remote detection of objects in a surveillance zone (10) is preferably intended to be used in an article surveillance zone, which further has at least one transmitter means (11, 13) and at least one receiver means (12, 15) for transmitting and receiving, respectively, electromagnetic radio-frequency signals in the surveillance zone, and at least one modulating means (16) for generating a modulation field in the surveillance zone. The sensor is arranged to transmit an electromagnetic reply signal at the reception of electromagnetic energy from the transmitter means, said reply signal being dependent on the modulation field and being receivable by the receiver means. A magnetic element (23) is arranged in a sensor body (21; 101, 102), the magnetic properties of the element being controllable by a magnetic field acting as the modulation field, wherein the amplitude of the reply signal from the sensor is controllable through the magnetic modulation field.

22 Claims, 11 Drawing Sheets

- ●   Glass cylinder, $\phi_{ext}$ = 7 mm, $\phi_{int}$ = 5,3 mm
- ×   Composite cylinder, $\phi_{ext}$ = 7 mm, $\phi_{int}$ = 4,8 mm
- +   Glass cylinder ($\phi_{ext}$ = 5 mm, $\phi_{int}$ = 3,7 mm) inside another glass cylinder ($\phi_{ext}$ = 7 mm, $\phi_{int}$ = 5,3 mm)
- ○   Glass cylinder, $\phi_{ext}$ = 6 mm, $\phi_{int}$ = 4 mm
- *   Glass cylinder, $\phi_{ext}$ = 5 mm, $\phi_{int}$ = 3,7 mm

- Liquid level = 40 mm
× Liquid level = 65 mm
+ Liquid level = 75 mm
○ Liquid level = 85 mm
* Liquid level = 100 mm o  Excitation frequency = 617 MHz
×  Excitation frequency = 700 MHz
∗  Excitation frequency = 800 MHz

* Cylinder thickness = 1,0 mm
● Cylinder thickness = 1,5 mm
○ Cylinder thickness = 2,2 mm

SENSOR FOR REMOTE DETECTION OF OBJECTS

TECHNICAL FIELD

The present invention relates to a sensor for remote detection of objects in a surveillance zone, preferably for use in an article surveillance system, which further comprises at least one transmitter means and at least one receiver means for transmitting and receiving, respectively, electromagnetic radio-frequency signals in the surveillance zone, and at least one modulating means for generating a modulation field in the surveillance zone, said sensor being arranged to transmit an electromagnetic reply signal at the reception of electromagnetic energy from said transmitter means, and said reply signal being dependent on said modulation field and being receivable by said receiver means.

DESCRIPTION OF THE PRIOR ART

For many years now a large demand for simple and still reliable surveillance systems for monitoring objects or articles within a given area has been noticed in various business and industrial applications. A common example is shop antipilferage systems, which are available in many different kinds. A simple and inexpensive protection is obtained by providing articles that are especially liable to be stolen (such as clothes) with an antipilferage cassette, which is attached to the article. The cassette comprises a liquid substance, such as ink, which is arranged to discolour the article to make it useless for normal use, if stolen. In U.S. Pat. No. 5,275,122 an exemplary cassette is shown, comprising a base portion, a mounting pin protruding from the base portion, a pair of liquid-filled glass tubes arranged in the base portion and acting as an ink ampoule, and a disc mounted below the ink ampoule. The mounting pin extends between the two glass tubes and is connected at a first end to the disc. The article to be protected from theft is drawn over the mounting pin in the cassette, for instance through a button hole or directly through the fabric, provided that the article in question is an article of clothing. The cassette is then provided with an upper portion, which is threaded on the mounting pin to secure the article between the base portion and the upper portion. If an unauthorized person tries to remove the cassette upper portion, the disc will impact the fragile ink ampoule through the mounting pin, wherein the former will break or otherwise start leaking. The cassette upper portion may only be separated from the base portion by means of a certain device, without causing damage to the ink ampoule.

Strictly mechanical theft protections according to the above have a disadvantage in that even if a potential shoplifter may be discouraged from attempting to steal an article (since the article will possibly be destroyed, if the theft protection is removed), nothing stops the shoplifter from leaving the theft protection untampered on the article at the actual moment of theft and only later removing the theft protection at an undisturbed location other than the shop premises. This disadvantage may be eliminated by means of electronic article surveillance systems as described below, which may detect the actual shoplifting attempt—i.e. when the shoplifter tries to bring the article out from the shop premises—and in response thereto generate an alarm signal so as to alert the shop personnel about the attempted theft.

According to a common type of electronic article surveillance systems each article is provided with a small label, comprising a thin metal strip with magnetic properties. On either side of the shop exit arc-shaped magnetic field generating means are arranged for generating a magnetic field in between. When an article, which has been provided with an antipilferage label according to the above, is brought in between the arcs, the metal strip is affected by the magnetic field, and a detectable physical change occurs in the metal strip. Frequently, the fact that an alternating magnetic field will periodically switch the magnetic dipole momentum in the metallic strip is used. Alternatively, the metallic strip may be forced into mechanical resonance, provided that the material and dimensions of the strip are chosen accordingly. These physical changes are inductively detected by means of the arcs, wherein an attempted theft may be registered. Since the detection is made by inductive means, antipilferage systems of this kind suffer from a short detection range of a few meters only, requiring the antipilferage arcs to be arranged close to each other and thereby making the shop exit narrow and "unfriendly" for the customers.

In addition, various antipilferage systems of a more advanced type are previously known. For instance, U.S. Pat. No. 5,030,940 discloses an electronic article surveillance system. Electronic labels are used for marking and theft-protecting the desired articles. Such an electronic label is of a radio-frequency transponder type and comprises for instance an antenna, a power source such as a battery, and a non-linear circuit, for instance some kind of semi-conductor diode. Through its antenna the transponder may receive a first electromagnetic signal of a high frequency, which has been transmitted by a transmitter in the surveillance zone, as well as a second signal of a substantially lower frequency, by means of which an electrostatic field is generated in the surveillance zone. By varying the electrostatic field certain properties of the non-linear circuit are influenced, the most important of which being the electric reactance. These variations in reactance are amplified by the power source. The antenna is connected to the non-linear circuit, and hence a reply signal may be transmitted, which according to the above is composed by the two signals received. When a modified reply signal is detected as described above by a receiver in the surveillance zone, the system may determine the presence of an article within the surveillance zone and provide a suitable alarm signal as a consequence. A drawback of such transponders is that they require a plurality of components as well as a considerable space and a high price per unit.

Normally, for basic antipilferage applications as described above, it is only desired to determine the presence of a transponder or sensor in a surveillance zone, but not its identity or exact position in the zone. Such determination, however, is of interest in an adjacent technical field, e.g. price labelling of articles. A method and a device for this purpose are disclosed in WO93/14478. A label acting as a sensor or transponder is provided with an antenna and at least one electric resonance circuit, comprising inductive as well as capacitive means; a so-called LC-circuit. The resonance circuit is excited to self-oscillation by means of electromagnetic energy transmitted by an excitation means and received through the antenna of the sensor. By providing the label with an amorphous magnetic element and controlling the permeability of this element by means of an external heterogeneous magnetic bias field, also the resonance frequency of the resonance circuit may be controlled, since the change in permeability for the element will affect the inductive properties of the resonance circuit. Due to the factors above, the frequency of the reply signal transmitted from the resonance circuit is dependent on the magnitude and direction of the magnetic bias field in the position, where the sensor happens to be located. As a consequence, simultaneous detections of a plurality of identical sensors present in the surveillance zone are possible, thanks to the reply signals thereof being separated in the frequency domain through their different magnetic bias levels. Alternatively, a calculation "backwards" in three dimensions of the position for the sensor is possible by means of the detected frequency value, on condition that the heterogeneous magnetic bias field is known. By arranging a plurality of labels and/or amorphous magnetic elements in predetermined mutual positions a certain code space may be obtained, wherein the reply signal may for instance represent an article number assigned to the article.

U.S. Pat. No. 5,414,412 relates to a frequency-dividing transponder for use in an electronic article surveillance system. The transponder responds to detection of electromagnetic radiation of a first predetermined frequency by transmitting electromagnetic radiation of a second predetermined frequency, which is a frequency-divided quotient of the first predetermined frequency. The transponder includes an active strip of amorphous magnetic material with a transverse uniaxial anisotropy defining a magnetomechanical resonant frequency according to the dimensions of the strip at the second predetermined frequency, when magnetically biased to be within a predetermined magnetic field intensity range, so as to respond to excitation by electromagnetic radiation of the first predetermined frequency by transmitting electromagnetic radiation of the second predetermined frequency. The transponder further comprises a tripole strip of magnetic material of such coercivity and so disposed in relation to the active strip, as to create a magnetomechanical resonance in the active strip at the first predetermined frequency, when the active strip is magnetically biased to be within the predetermined magnetic field intensity range.

SUMMARY OF THE INVENTION

According to the present invention a sensor for remote detection of objects in a surveillance zone is proposed, where the communication from and to the sensor is electromagnetically performed with a long operating distance and a wide bandwidth, the output signal from the sensor providing a satisfactory signal strength as well as being possible to control or modulate in a way, which increases the detection accuracy. Additionally, the object of the invention is to provide a sensor, which may be manufactured from a minimum of components and thus at a very low cost per unit.

The object is achieved by a sensor according to the appended independent patent claim.

BRIEF DESCRIPTION OF THE DRAWINGS

The invention will be closer described in the following, reference being made to the accompanying drawings, in which FIG. 1 schematically illustrates an antipilferage system, in which a sensor according to the present invention is applied.

DETAILED DISCLOSURE OF THE INVENTION

Figure 1:
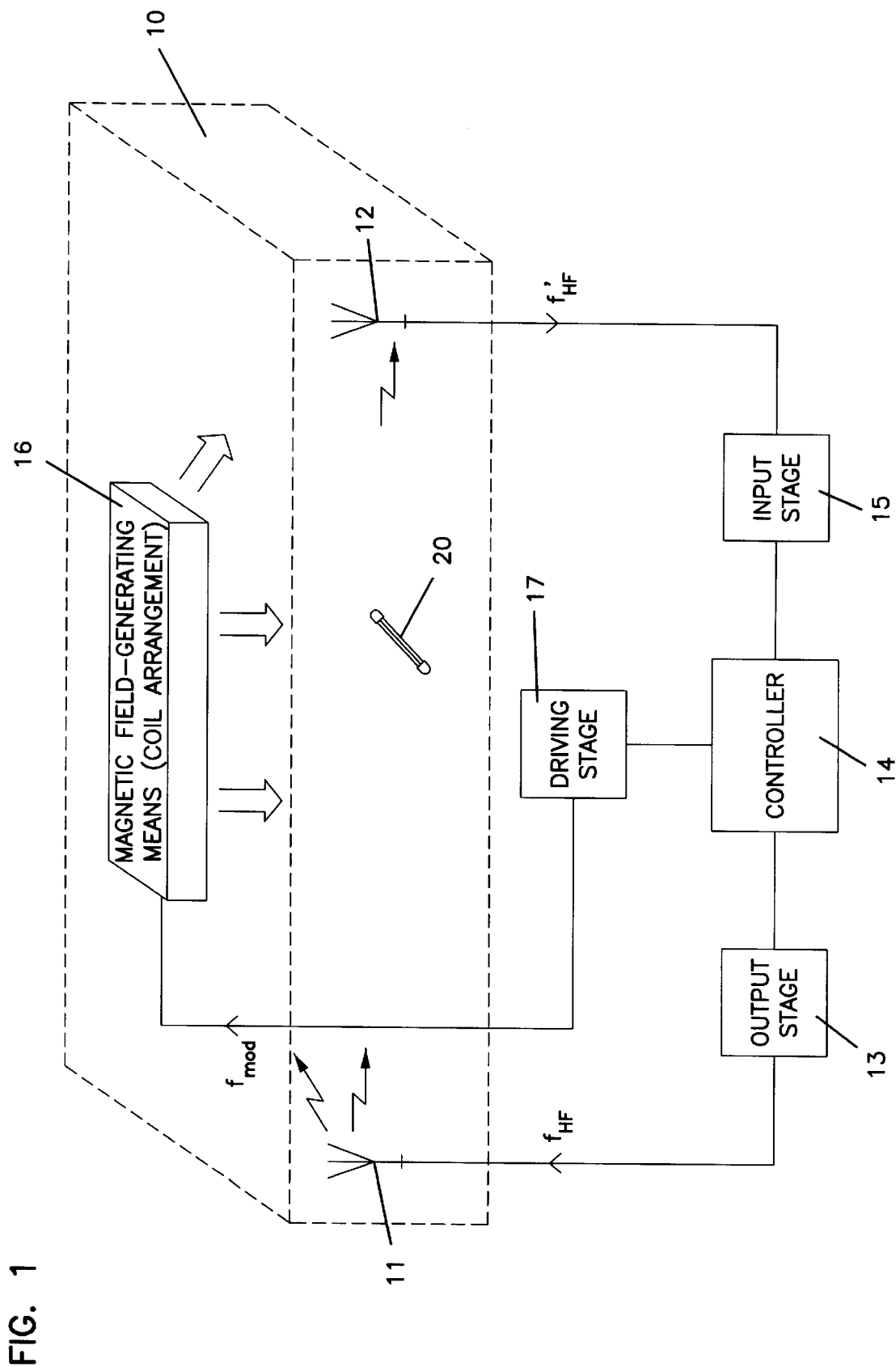

In FIG. 1 an antipilferage system is illustrated, wherein the sensor according to the present invention may be applied. A transmitter antenna 11 and a receiver antenna 12 are arranged in a surveillance or monitoring zone 10. The transmitter antenna 11 is operatively connected to an output stage 13, which in turn is connected to a controller 14. The output stage 13 comprises various conventional driving and amplifying circuits as well as means for generating a high-frequency electric current $i_{HF}$, which will alternately run back and forth through the transmitter antenna 11 when supplied thereto, thereby generating a high-frequency electromagnetic field at a frequency $f_{HF}$ around the transmitter antenna. As will be described in more detail below, this electromagnetic field is used for exciting a transponder or sensor 20 present in the surveillance zone 10, said transponder or sensor transmitting an electromagnetic reply signal to be received by the receiver antenna 12, in response to the reception of electromagnetic energy from the transmitter antenna 11.

The receiver antenna 12 is operatively connected to an input stage 15, comprising conventional amplifying and signal-processing means, such as bandpass filters and amplifier circuits. Furthermore, the input stage 15 is connected to the controller 14 and is arranged to forward a signal, which has been received and processed as described below, to said controller 14.

Hence, the transmitter antenna 11 as well as the receiver antenna 12 are arranged for conventional conversion between an electric high-frequency signal and an electromagnetic one. Preferably, the antennas are conventional end-fed or center-fed, half-wave whip antennas, but other conventional antennas may be used just as well.

Additionally, the surveillance zone 10 is provided with a magnetic field-generating means 16, preferably a coil arrangement. In situations where the surveillance zone 10 is a monitored shop exit, the coil arrangement is preferably arranged just below the ceiling level or between ceiling and roof. This arrangement has an aesthetic advantage in that the entire coil arrangement is made less noticeable or even invisible to the shop customers, thereby consequently providing a higher degree of freedom when designing an aesthetically appealing shop exit.

Preferably, the magnetic field-generating means 16 comprises an electric conductor, e.g. copper wire, which is wound in one turn or a plurality of turns around a coil frame. Preferably, the coil arrangement is essentially formed as a rectangle, which is large enough for covering the whole of the desired surveillance zone, (e.g. the shop exit) by a magnetic modulation field described below. For this reason the dimensions of the coil arrangement with respect to the length and width thereof are in the order of a few meters.

The coil arrangement 16 is connected to the controller 14 via a driving stage 17. The driving stage 17 comprises means for generating a modulating current $i_{mod}$, which is fed through the coil for generating a magnetic modulation field $H_{mod}$ around the coil, the propagation of the field covering substantially the entire surveillance zone 10. The modulating current is given a known variation in amplitude with respect to time according to $i_{mod}(t)=f(t)$. In its most basic form the modulating current corresponds to a pure sine waveform according to $$i_{mod}(t)=A \sin(2\pi f_{mod} t),$$

where A as usual represents the amplitude of the current and $f_{mod}$ represents the frequency thereof, but other more complicated mathematic functions are also possible.

When an electric current i is fed through a straight electric conductor, a magnetic field is generated, the field strength H of which is linearity dependent on this current according to $H=i/2\pi r$, where r represents the distance to the conductor, and hence the magnetic modulation field $H_{mod}$ described above will vary in accordance with the modulating current $i_{mod}$.

Figures 2, 3:
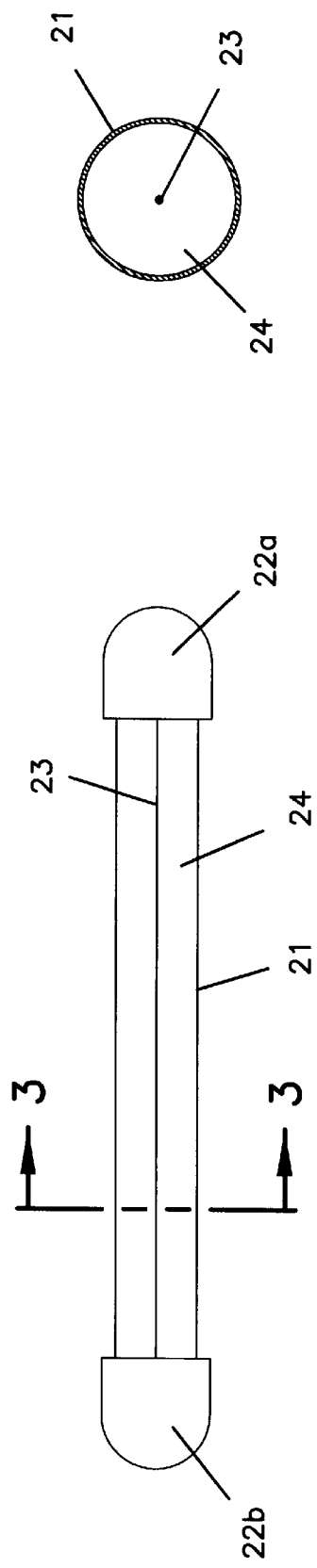
FIG. 2 is an enlarged sideview of a sensor according to a preferred embodiment of the invention.
FIG. 3 is an enlarged sectional view of the sensor according to FIG. 2, when viewed from the section III—III in FIG. 2.

In FIGS. 2 and 3 a sensor 20 according to a preferred embodiment of the invention is shown. A sensor body 21 constitutes a housing for the sensor, but it also takes active part in the actual sensor function, as will be described in more detail below. The sensor body 21 consists of a material with dielectric properties, where the relative dielectric constant or permittivity $\epsilon_r$ is larger than that of air (=1). According to the preferred embodiment the sensor body is formed as a cylinder with walls made from glass or a similar material, such as a composite material consisting of glass fiber and resin, but other materials, e.g. plastic material, are possible too. The sensor body 21 is sealed at both ends (either directly sealed by melting the glass material, or by separate plugs 22a, 22b) according to FIG. 2.

A wire-shaped element 23 of amorphous magnetic material is arranged inside the sensor body in the longitudinal direction of the latter. The element 23 is surrounded by a dielectric liquid, which entirely or partly fills up the cylinder-shaped cavity inside the sensor body 21. The liquid has a high dielectric constant. In the preferred embodiment the liquid is ink or another heavily coloured liquid of the kind, which is already used in conventional antipilferage ampoules, as described above in section "Description of the Prior Art". An advantage of the invention is in fact that the sensor may have a conventional "discolouring function" in addition to the radio-frequency transponder function described below. In such applications the sensor body is formed according to the prior art (see for instance U.S. Pat. No. 5,275,122) as an ink-filled glass ampoule with means for breaking the glass, when the sensor is removed from the article by an unauthorized person. A double protection against theft is hereby obtained, since such a sensor arrangement will protect a) the sensor as a whole (if the sensor is removed from the article, the article will be discoloured) and b) the electromagnetic sensor function (the wire-shaped element cannot be removed without breaking the sensor glass and creating a discolouration of the protected article). The liquid-based surroundings of the wire-shaped element have the additional and quite positive effect that the signal strength of a reply signal transmitted from the sensor will be substantially increased (by several dB), as compared to a case without liquid.

Even if the liquid according to above has been described as ink or another coloured liquid, plain water ($\epsilon_r \approx 80$), an alcohol-based liquid ($\epsilon_r \approx 60$) or essentially any liquid, preferably with dipole properties, may be used as well.

According to the preferred embodiment of the invention the wire-shaped element 23 is made from the amorphous cobalt-rich alloy $Co_{68.1}Fe_{4.4}Si_{12.5}B_{15}$, but other alloys, which fulfill the functional demands described below, are possible too. One possible alternative alloy is $Co_{70.5}Fe_{4.5}Si_{15}B_{10}$. Both these alloys are more or less completely free from magnetostriction, meaning that they are not likely to convert magnetic energy to mechanical energy, thereby avoiding the risk of undesired mechanical resonance phenomena.

The wire-shaped element is electrically conductive, and the physical dimensions thereof are adjusted for optimum antenna function, as described below. According to the preferred embodiment the diameter of the element is 124 $\mu$m and the length is 60–65 mm. Furthermore, the amorphous material of the element exhibits magnetic properties, and an essential feature is that the permeability of the material may be controlled under the influence from an external magnetic field. This controllable permeability is used in two different ways according to the invention; for controlling the amplitude of an electromagnetic reply signal from the sensor, and for controlling the frequency of the reply signal.

When a sensor 20 present in the surveillance zone 10 is exposed to the electromagnetic excitation field with frequency $f_{HF}$ transmitted by the transmitter antenna 11, the wire-shaped element 23 operates as an antenna. An electric current $i_{element}$ is induced in the wire-shaped element, provided that the length of the element is adjusted to the frequency $f_{HF}$—or rather to the corresponding wavelength—of the received high-frequency excitation signal. An element length of 60–65 mm requires a frequency $f_{HF}$ within the radio-frequency range, preferably between 500–900 MHz. Also the dielectric environment (the liquid combined with the glass material of the sensor body) around the wire-shaped element is important in this respect. The dielectric environment causes a reduction in the speed of light c as compared to the speed of light in vacuum, wherein the length of the antenna is virtually increased for the sensor. The dielectric environment also provides for an improved reception of an incoming electromagnetic signal, since the dipolar properties of the dielectric environment amplifies the electric component of the incident electromagnetic field.

Thus, the induced current $i_{element}$ runs back and forth through the element 23 at a frequency $f_{element}=f_{HF}$. This alternating current causes the generation of an electromagnetic field around the element 23, said field propagating through the surveillance zone 10 and reaching the receiver antenna 12 as a reply signal, the receiver antenna then receiving and forwarding the signal to the controller 14 as an indication of the presence of a sensor in the surveillance zone 10. Consequently, the wire-shaped element 23 has the simultaneous functions of a receiver of the electromagnetic excitation signal as well as a transmitter of the electromagnetic reply signal. However, since the signals are of the same frequency, they would not be possible to separate from each other, if the measures below had not been taken.

As described above, by the magnetic modulation field $H_{mod}$ the permeability $\mu_r$ of the wire-shaped element material may be controlled. According to the preferred embodiment $H_{mod}$ varies sinusoidally at the frequency $f_{mod}=500$ Hz. However, other frequencies are equally possible within a low-frequency range up to at least 1000 Hz.

Now, the amplitude of the reply signal may be controlled by the so called giant-magnetoimpedance effect or skin-depth effect in the amorphous magnetic material of the element. This effect, which has been described in the report "Giant magnetoimpedance and magneto-inductive effects in amorphous alloys" in "J. Appl. Phys. Vol. 76, No. 10, Nov. 15, 1994" may be summarized according to the simplified model below.

It is a well-known fact that the effective sectional conducting area $A_{\mathit{eff}}$ in an electric conductor is reduced when the frequency is increased (so called skin-depth effect). $A_{\mathit{eff}}$, having a strictly circular shape at DC (the conducting electrons flow everywhere in the conductor), will at high frequencies resemble a ring of a certain width $\epsilon$. The reason for this is, among others, that eddy currents are generated in the interior of the conductor, said eddy currents restricting the availability for the conducting electrons. The width e of the effective conductive area $A_{\mathit{eff}}$ may be expressed according to $$\varepsilon = \sqrt{\frac{\rho}{\pi \cdot \mu \cdot f}},$$

where $\rho$ represents the resistivity of the conductive material, $\mu$ represents the permeability thereof, and f represents the frequency. From $$R = \frac{\rho}{\varepsilon}$$

the following is obtained $$R = \sqrt{\pi \cdot \mu \cdot f \cdot \rho},$$

i.e. the resistance R is a function of $\mu$ and f. Through the $\mu$-dependence of the resistance the amplitude of the current through the conductor will change as a function of $\mu$.

If the model above is applied to the wire-shaped element in the sensor according to the present invention, it is readily realized that the amplitude of the current $i_{\mathit{element}}$ varies in accordance with the variations in the magnetic modulation field $H_{\mathit{mod}}$, which according to the above controls the permeability $\mu_r$ of the element. As a consequence, the electromagnetic reply signal transmitted from the element 23 and the sensor 20 will be constituted by a signal, the amplitude of which is modulated by the frequency $f_{\mathit{mod}}$ and the carrier frequency of which is $f_{\mathit{HF}}$. This amplitude-modulated signal will then be demodulated in a conventional way by the input stage 15. The additional information provided by the amplitude-modulation may be used by the controller for improving the accuracy of the detection; i.e. for minimizing the number of sensors which avoid detection in the surveillance zone, but also for minimizing the risk of false alarms, when a sensor is located outside the surveillance zone but still replies to an incoming excitation signal.

As mentioned above, also the frequency of the reply signal may be controlled by the magnetic modulation field. According to the preferred embodiment of the invention the sensor forms an electric resonance circuit, which may be functionally compared to the LC-circuit described in WO93/14478. The dielectric environment around the wire-shaped element 23 (the sensor body 21 and/or the liquid 24) provides the capacitive properties of the circuit, while the inductive properties are provided by the element 23 itself, which operates as an antenna at the same time. According to the above the element permeability $\mu_r$ depends on the magnitude of the magnetic modulation field $H_{\mathit{mod}}$, and since $L = f(\mu_r)$ and the resonance frequency $f_{\mathit{res}} = F(L)$, the value of $f_{\mathit{res}}$ will vary, when the sensor is supplied with electromagnetic energy from the excitation signal, while simultaneously being affected by the magnetic modulation field $H_{\mathit{mod}}$. In other words an electromagnetic reply signal is obtained, the frequency of which is modulated by the frequency $f_{\mathit{mod}}$ and the carrier frequency of which is $f_{\mathit{HF}}$. As described above for the amplitude modulation, a received frequency-modulated reply signal will be demodulated by the input stage 15, before the signal is forwarded to the controller 14.

By performing trials various variations of the sensor according to the described embodiment have been studied. The trial results, which are illustrated as diagrams in FIGS. 4-8b, will now be discussed.

Figure 4:
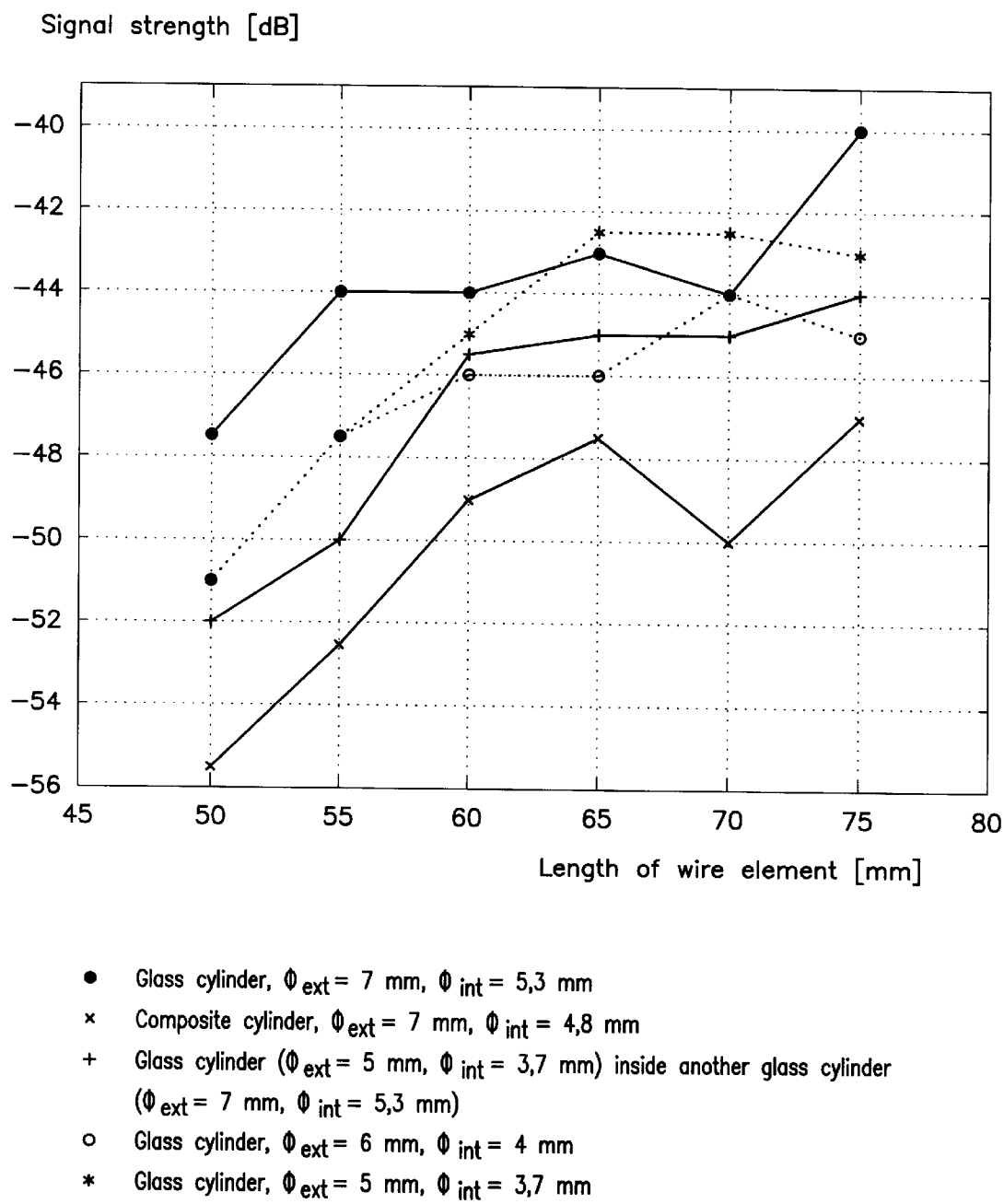
FIG. 4 shows a diagram, which illustrates the results from a first trial, where some parameters are varied for the preferred embodiment of the invention.

FIG. 4 discloses a diagram from a trial, where the received signal strength (in dB) was studied, when the length of the wire-shaped element was varied insteps of 5 mm for different outer diameters $\Phi_{\mathit{ext}}$ and inner diameters $\Phi_{\mathit{int}}$, respectively, of the cylinder-shaped sensor body 21, and for different choices of material for the sensor body. The legend in the drawing indicates the variants, to which the different graphs are related. The cylinder-length is constantly 75 mm, and the cylinder is completely filled with water. The wire-shaped element is made from the alloy $Co_{68.1}Fe_{4.4}Si_{12.5}B_{15}$, and is freely arranged inside the cylinder 21. The sensor 20 is excited at a constant frequency $f_{\mathit{HF}}$ within the 500–600 MHz range. One variation consists in that a thin cylinder is placed inside a thicker cylinder, but this apparently gives a weaker signal, than if the thicker cylinder was used alone. The best result (the strongest signal) is achieved when $\Phi_{\mathit{ext}} = 7$ mm.

Figure 5:
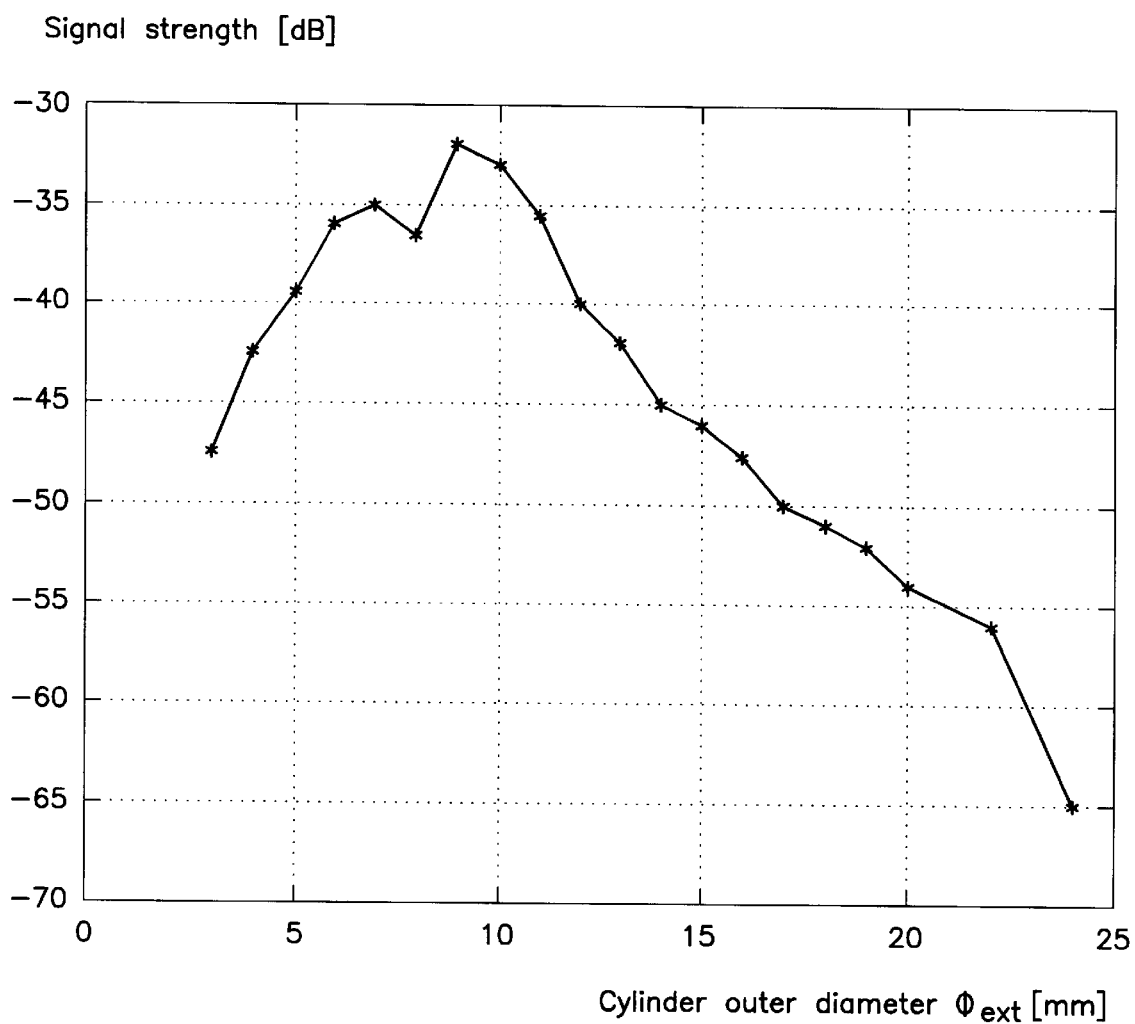
FIG. 5 shows a diagram, which illustrates the results from a second trial, where some parameters are varied for the preferred embodiment of the invention.

FIG. 5 shows the results from a trial, where the length of the element is constantly 65 mm and where a cylinder with a length of 100 mm is filled with water up to 65 mm. The outer diameter $\Phi_{\mathit{ext}}$ of the cylinder was varied between 3 mm and 24 mm. Apart from this, the conditions correspond to the ones in the previous drawing.

Figure 6A:
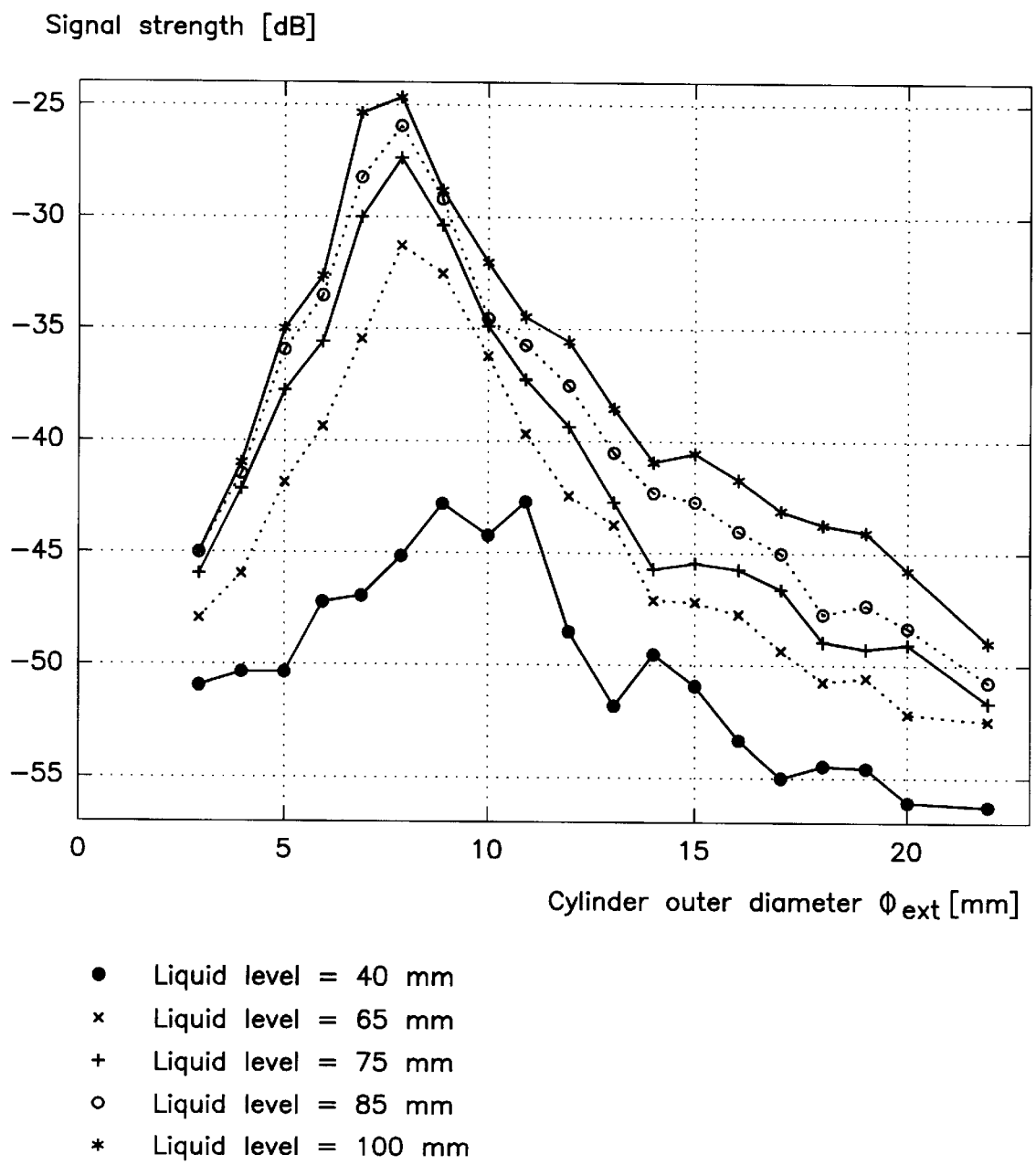
FIGS. 6a–6b show a diagram, which illustrates the results from a third trial, where some parameters are varied for the preferred embodiment of the invention.
Figure 6B:
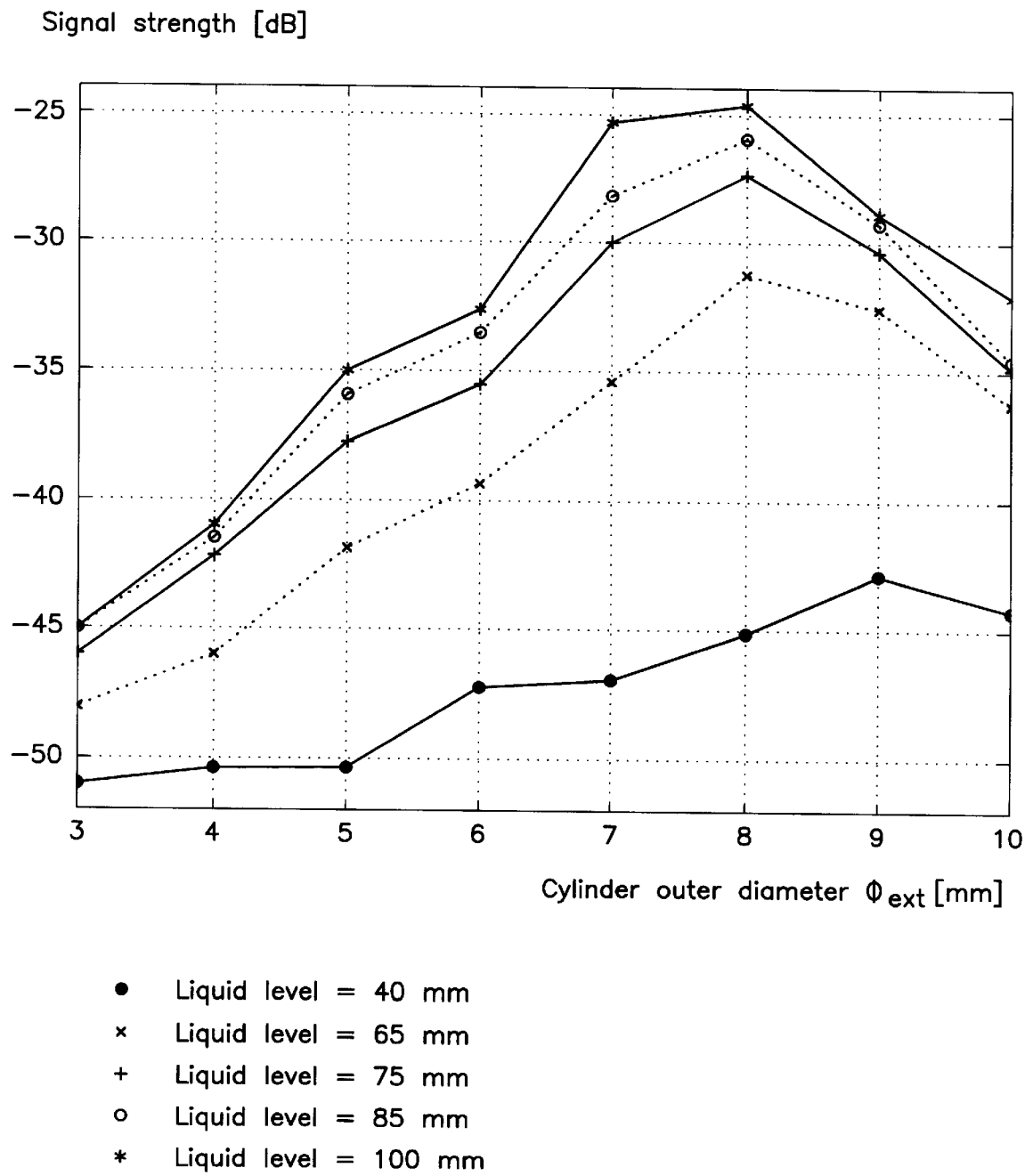

In FIGS. 6a and 6b the length of the element is constantly 65 mm, and the length of the cylinder is constantly 100 mm. The water level is varied inside the cylinder, and so is the cylinder outer diameter. It appears from the graphs that the best result is achieved for $\Phi_{\mathit{ext}} = 8$ mm and a water level of 100 mm (completely filled cylinder).

Figure 7A:
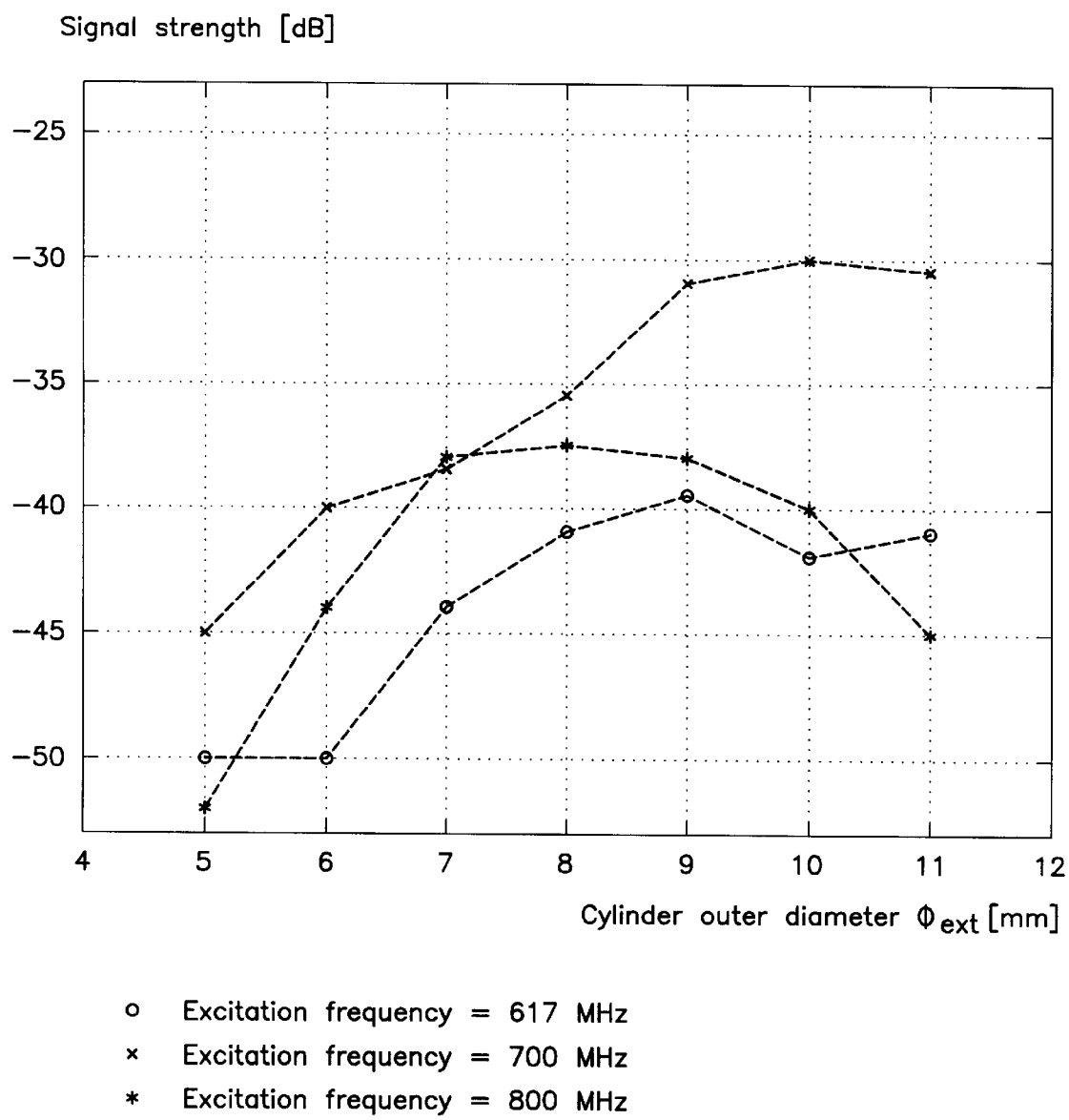
FIGS. 7a–7b show a diagram, which illustrates the results from a fourth trial, where some parameters are varied for the preferred embodiment of the invention.
Figure 7B:
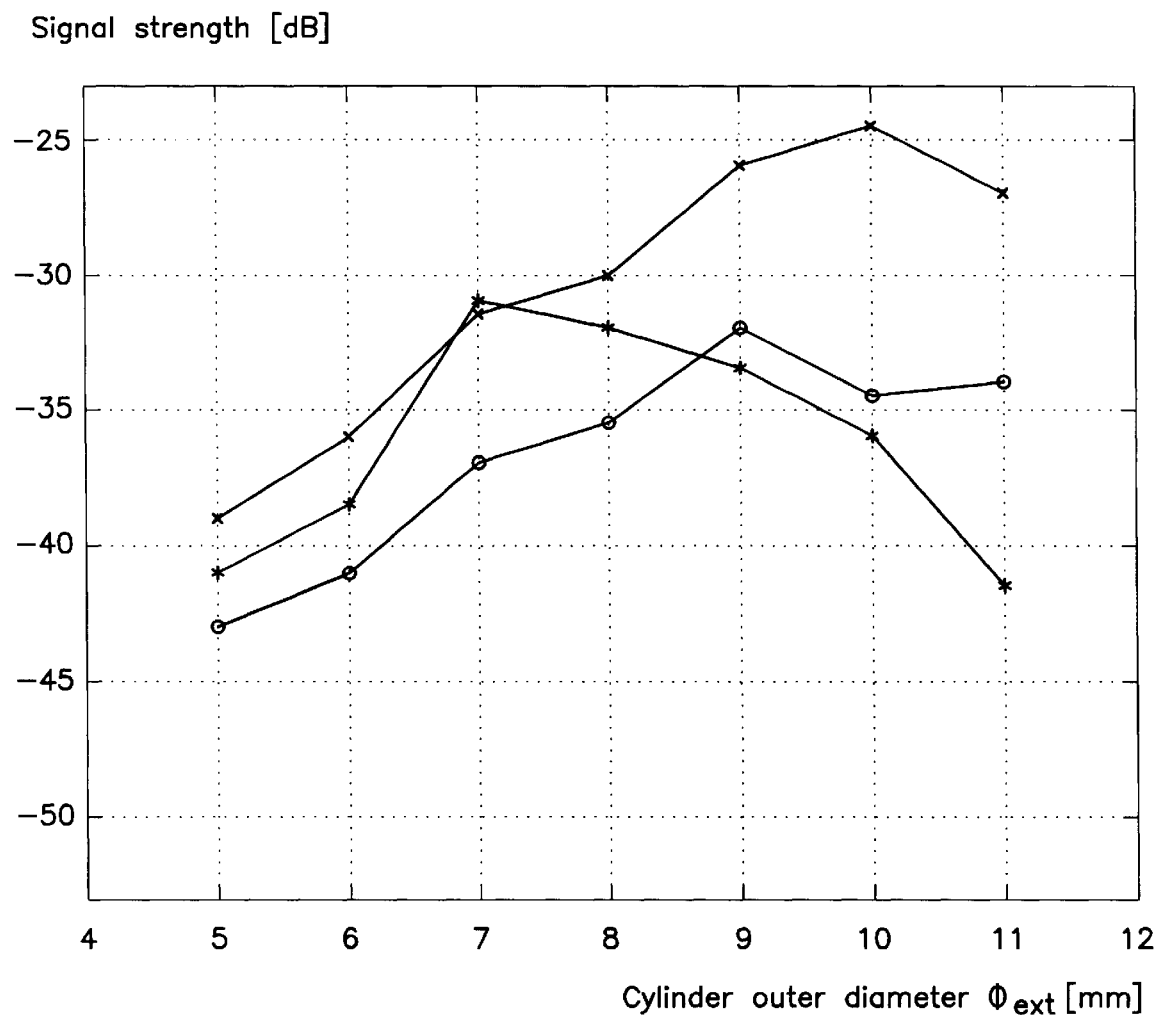

The element length is constantly 65 mm and the cylinder length is constantly 100 mm also in FIGS. 7a and 7b. Here the excitation frequency $f_{\mathit{HM}}$ is varied, and so are the cylinder outer diameter and the water level. In FIG. 7a the water level is 65 mm, while it is 100 mm in FIG. 7b. It appears from the graphs that the signal reaches optimum at different cylinder outer diameters for different excitation frequencies.

Figure 8A:
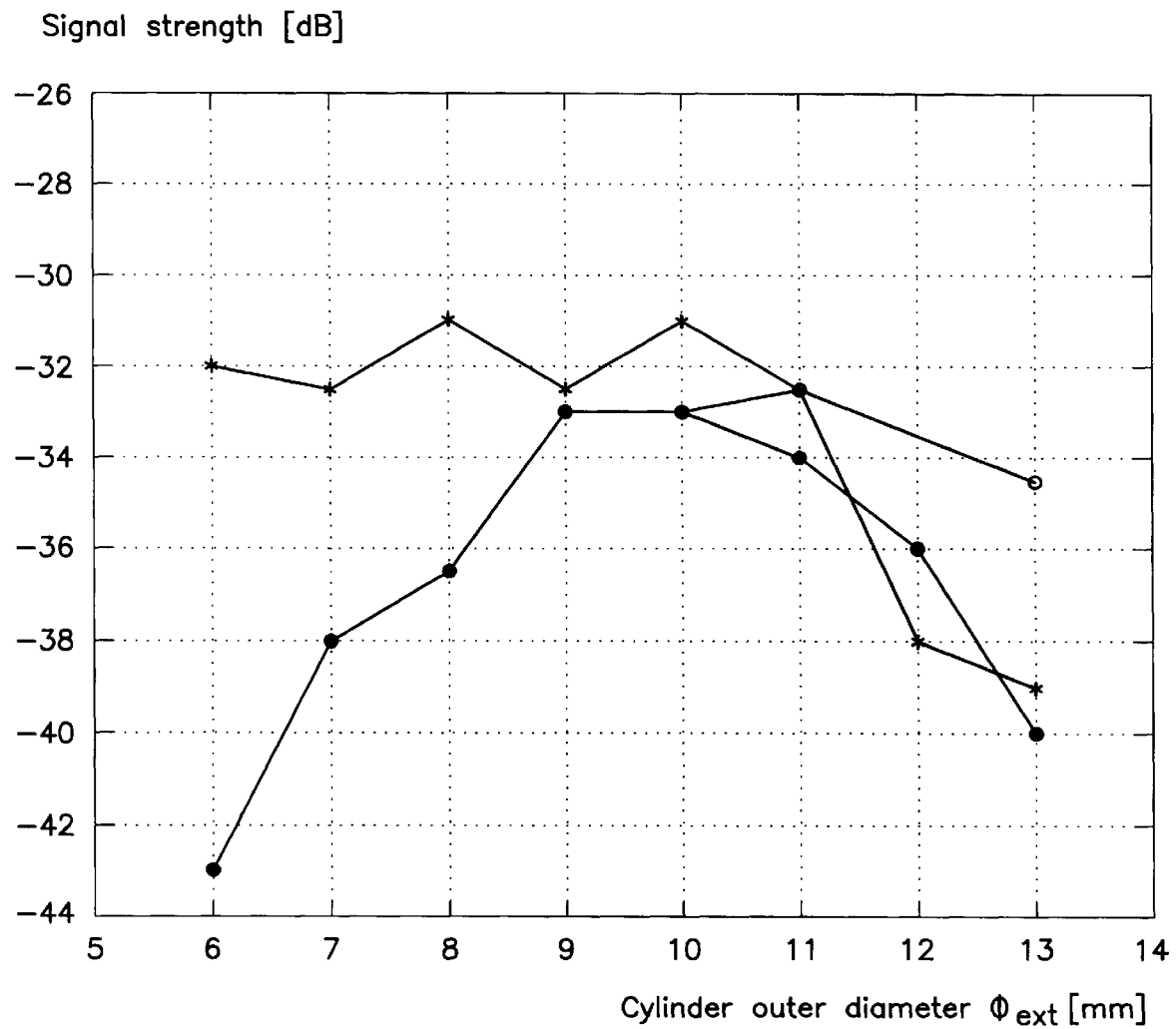
FIGS. 8a–8b show a diagram, which illustrates the results from a fifth trial, where some parameters are varied for the preferred embodiment of the invention.

According to FIG. 8a the element length is constantly 65 mm, the cylinder length is constantly 100 mm, the water level is 70 mm, $f_{\mathit{HF}} = 638$ MHz and $f_{\mathit{mod}} = 522$ Hz. The cylinder outer diameter and the cylinder thickness are varied. The thinnest thickness of material gives the strongest signal. Furthermore, it is noticed that the signal gets weaker, if the cylinder outer diameter is chosen too large.

Figure 8B:
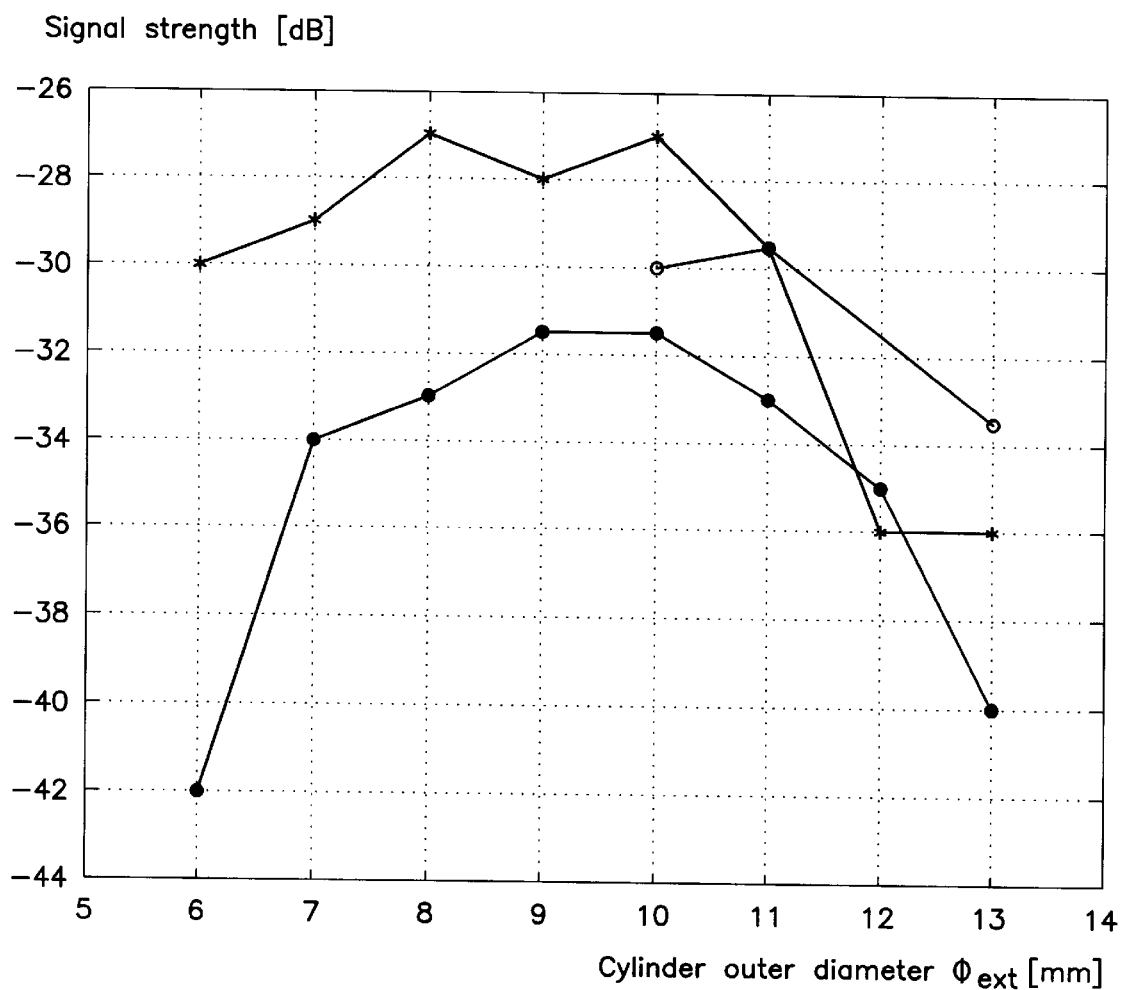

The same conditions applies for FIG. 8b as in FIG. 8a, apart from the water level now being a full 100 mm. The results from the previous drawing are here confirmed.

From the trial results described above, and from other trial results, the conclusion may be drawn, that an optimum design is achieved, if the following conditions are fulfilled:

the cylinder is completely filled with liquid, the wire is arranged in the center of the cylinder, $\Phi_{ext} \approx 6-7$ mm, the difference $\Phi_{xet} - \Phi_{int}$ is as small as possible, the wire has a maximum length with respect to the length of the cylinder, and the $\epsilon_r$-value of the liquid is as high as possible.

Furthermore, it appears from the trial results, FIGS. 7a and 7b in particular, that the sensor is fully operational within a broadband frequency spectrum of at least a few hundred MHz, thereby making the sensor relatively insensible to changes in the excitation frequency. This is a considerable advantage compared to previously known sensor types, since the manufacturing will be simplified, as the need is eliminated for a precise tuning of the resonance or reply frequency.

Additionally, the sensor has proven to be operational at a distance of the order of 10 m, and this too is a substantial advantage compared to previously known sensor types (cf. the section "Description of the Prior Art" above).

A further advantage of a sensor design according to the above is that it enables a very simple manufacturing process. Basically, one simply has to provide the glass ampoule 21 with its liquid 24, insert the wire-shaped element 23 and then seal or close the glass ampoule. Apparently, such a sensor may be manufactured at a very low price per unit.

Figure 9:
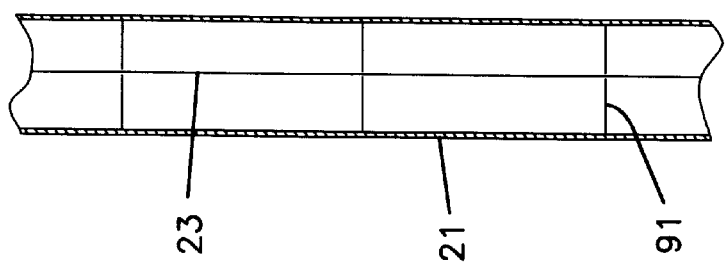
FIG. 9 illustrates an alternative to the preferred embodiment of the invention, illustrating a way of centering an elongated magnetic element within a sensor housing.

As mentioned above trials have proven, that the reply signal will be strongest, if the wire-shaped element is firmly mounted in the center of the cylinder along the cylinder axis. Such fixed arrangement may according to FIG. 9 be provided by arranging a number of circular discs 91 at regular intervals with respect to each other firmly and perpendicularly against the inner surface of the cylinder. A small opening is made in each disc, wherein the diameter of the opening only slightly exceeds the thickness of the wire-shaped element. By inserting the element through the opening the element may be held in place due to the frictional engagement between the element and the inside of the respective opening.

Alternatively, amorphous materials of a so-called stress-annealed kind may be used. This means that the wire-shaped element has been annealed when manufactured under the influence from a tensional force along the main axis of the element. Through the annealing the element will maintain a perfect stiffness and straightness, once the annealing has finished. By carefully adjusting the length of such an element so that the element will precisely fit between the inner sides of the cylinder ends, the element will be maintained in a centered position through the stiffness of the element, as desired.

Furthermore, the wire-shaped element may be made by so-called flash-annealing, wherein an electric current is fed through the element for a certain time, said electric current generating heat as well as a magnetic field around the element suitable for creating optimum domain structures.

According to a variant of the preferred embodiment of the invention also the liquid-based dielectric environment 24 around the wire-shaped element 23 is given magnetic properties. Preferably, this is achieved by adding a highly fine-grained ferromagnetic or paramagnetic material to the liquid and suspending the mixture so as to obtain a colloidal solution. The dissolved magnetic particles are prevented from sedimentation on the bottom of the cylinder 21 by adding any stabilizer known per se. Such liquids with magnetic properties are commonly referred to as ferrofluids and are well-known within several technical fields, therefore not requiring any detailed description herein. However, it may be noticed that water-based as well oil-based ferrofluids may be used together with the present invention.

By creating surroundings or an environment for the wire-shaped element 23 as described above, where the environment has not only dielectric properties but also magnetic properties, the following positive effect is obtained. The magnitude of the magnetic modulation field decreases rapidly with the distance from the coil arrangement 16. If a sensor 20 is located in the outmost region of the intended detection zone, there is an apparent risk of the modulation of the sensor reply signal becoming too weak for detection. However, the microscopic magnetic particles in the liquid 24 will all be oriented according to the incident magnetic modulation field due to their dipolar magnetic properties (even if the magnetic modulation field is very weak), and each individual particle contributes to a slight increase in field strength in each respective position. All small contributions are added to the incident modulation field, thereby considerably increasing the field strength in the center of the sensor, i.e. where the wire-shaped element 23 is located. Trials have proven that a weak magnetic modulation field may be amplified at least a hundred times by using a liquid with magnetic properties according to the above.

According to an alternative embodiment of the invention another kind of magnetic sensor element is used, namely a multi-layer type of element. Such an element does not have to be wire-shaped, i.e. have a circular cross section, but is preferably given a substantially flat cross section. The physical effect used according to this embodiment is the so-called magneto-resistance, which is thoroughly described in for instance the article "Giant magneto-resistance in spin-valve multilayers", B. Dieny ("Journal of Magnetism and Magnetic Materials 136, 1994, 335–359"). The resistance R of such a material depends on the resistivity $\rho_r$ of the material, which in turn depends on a magnetizing field strength H. Thus, $R=f(\rho_r(H))$, wherein a modulation in amplitude according to the one described above may be achieved.

Figure 10:
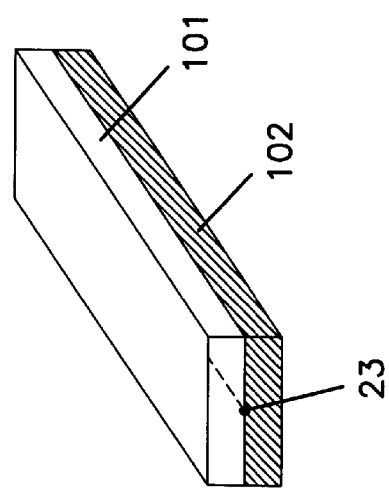
FIG. 10 illustrates an alternative embodiment of the invention.

According to a second alternative embodiment the dielectric environment around the sensor element 23 is completely made up of a solid material, which forms the sensor body 21 at the same time. According to FIG. 10 this sensor body is formed by two rectangular plates 101, 102, which are arranged on top each other with the wire-shaped element 23 arranged in between. The dielectric plates may preferably be realized from a highly dielectric material, which today is used in GPS-antennas of so-called patch antenna type and which is available from Trans-Tech, Inc., Adamstown, Md., USA and is described in the publication No. 50040100 from this company. Examples of such materials are barium tet-ratitanate or nickel-aluminium titanate. Alternatively, the sensor body may be formed as one homogeneous element made from the material above, wherein a recess will be formed in the center of the sensor body extending along the longitudinal axis of the sensor. The wire-shaped element 23 is arranged in this recess. Functionally, the sensor according to this alternative embodiment corresponds fully to the embodiments described above, where the environment consists of a dielectric liquid.

The descriptions above of the various embodiments of the invention are to be taken as embodiment examples only. Other embodiments may deviate from the ones described above within the scope of the invention, as defined in the appended patent claims. For instance, the sensor body 21 may not necessarily have to be formed as a cylinder but instead have for instance a polygonal-shaped cross-section.

Furthermore, the sensor body and the liquid inside the sensor body are not both required to have dielectric properties. Additionally, the liquid may be omitted, even if this is not considered suitable-at the moment with respect to the signal properties. The sensor element may be given other forms than the ones described above, and the element material may consist of any material which fulfills the functional demands according to the claims and description.

What is claimed is:

1. A sensor for remote detection of objects in a surveillance zone (10), preferably for use in an article surveillance system, which further comprises at least one transmitter means (11, 13) and at least one receiver means (12, 15) for transmitting and receiving, respectively, electromagnetic radio-frequency signals in the surveillance zone, and at least one modulating means (16) for generating a modulation field in the surveillance zone, said sensor being arranged to transmit an electromagnetic reply signal at the reception of electromagnetic energy from said transmitter means, and said reply signal being dependent on said modulation field and being receivable by said receiver means, characterized by a magnetic element (23) arranged in a sensor body (21; 101, 102) and having a magnetic property, which is controllable by a magnetic field acting as said modulation field, so that the amplitude of the reply signal from the sensor is modulated by said magnetic modulation field.

2. A sensor according to claim 1, characterized in that also the frequency of the reply signal from the sensor is modulated by said magnetic modulation field.

3. A sensor according to claim 1, characterized in that the magnetic element (23) is made from an amorphous cobalt-rich alloy.

4. A sensor according to claim 3, characterized in that the amorphous alloy is made from any of the alloys $Co_{68.1}Fe_{4.4}Si_{12.5}B_{15}$ or $Co_{70.5}Fe_{4.5}Si_{15}B_{10}$.

5. A sensor according to claim 1, characterized in that the magnetic element (23) is wire-shaped.

6. A sensor according to claim 1, characterized in that the wire-shaped magnetic element (23) is manufactured by so-called flash-annealing.

7. A sensor according to claim 1, characterized in that the magnetic element (23) is contained in an environment (24; 101, 102), consisting of at least one dielectric material, the relative dielectric constant or permittivity $\epsilon_r$ of which is larger than that of air.

8. A sensor according to claim 7, characterized in that the dielectric environment (24) is liquid-based around the magnetic element (23).

9. A sensor according to claim 8, characterized in that the liquid-based environment (24) around the magnetic element (23) at least partly consists of water, ink, alcohol, or any other liquid with a relative dielectric constant or permittivity $\epsilon_r$ exceeding 40, or consists of any combination of such liquids.

10. A sensor according to claim 8, characterized in that the liquid-based environment (24) is limited by a cylinder (21), which is sealed at either ends (22a, 22b) and acts as a sensor body.

11. A sensor according to claim 10, characterized in that the cylinder (21) comprises glass or a material similar to glass, the relative dielectric constant or permittivity $\epsilon_r$ of which is at least one order of magnitude larger than that of air.

12. A sensor according to claim 10, characterized by the magnetic element (23) being arranged in the center of the cylinder (21) along its longitudinal axis.

13. A sensor according to claim 10, characterized in that the magnetic element (23) is arranged in a close vicinity of the inner surface of the cylinder (21) along a direction, which is essentially parallel to the longitudinal axis of the cylinder.

14. A sensor according to claim 12, characterized by a plurality of disc-shaped means (91), which are arranged in spatial relationships with respect to each other inside the cylinder (21) in perpendicular connection to the inner surface of the cylinder, and the outer diameter of which correspond to the inner diameter of the cylinder, an opening being formed in the center of each disc-shaped means for receiving and fixing the magnetic element (23).

15. A sensor according to claim 12, characterized by the magnetic element (23) being an amorphous wire of a kind, which when manufactured is heat-treated or annealed under tension in the longitudinal direction.

16. A sensor according to claim 8, characterized in that the liquid-based environment (24) of the magnetic element (23) in addition comprises suspended or dissolved particles with magnetic properties.

17. A sensor according to claim 16, characterized in that the liquid-based environment (24) of the magnetic element (23) at least partly is a ferrofluid.

18. A sensor according to claim 1, characterized by a substantially homogeneous sensor body, which is made from a solid dielectric material, and a recess formed in the center of the sensor body in parallel to the longitudinal axis of the sensor, the a magnetic element (23) being arranged in the recess.

19. A sensor according to claim 1, characterized by at least two essentially parallel-epipedic plates (101, 102), which are put together for forming the sensor body and which are arranged to fix the magnetic element (23) in between and in the longitudinal direction of the sensor.

20. A sensor according to claim 1, characterized in that the sensor is arranged to receive an electromagnetic first signal within a first frequency range $\Delta f_1$, to receive a magnetic second signal with a second frequency range $\Delta f_2$, where $\Delta f_1 >> \Delta f_2$, and to transmit an electromagnetic reply signal composed by the first signal, the amplitude of which is modulated by the second signal.

21. A sensor according to claim 1, characterized in that the sensor is arranged to receive an electromagnetic first signal within a first frequency range $\Delta f_1$, to receive a magnetic second signal with a second frequency range $\Delta f_2$, where $\Delta f_1 >> \Delta f_2$, and to transmit an electromagnetic reply signal composed by the first signal, the frequency of which is modulated by the second signal.

22. A sensor according to claim 1, characterized by the magnetic element (23) being made from such a magnetic material, that the amplitude of the electromagnetic reply signal transmitted from the sensor is controllable through giant-magneto-impedance effects and/or giant-magnetoresistance effects in the material, when the sensor is exposed to said magnetic modulation field in the surveillance zone (10).

* * * * *